United States Patent [19]

Lindahl et al.

[11] Patent Number: 5,753,793
[45] Date of Patent: May 19, 1998

[54] APPARATUS FOR DETECTING THE MALFUNCTIONING OF AN ACCELEROMETER

[75] Inventors: Claus Lindahl, Holte; Henrik Brill Jensen, Vedæk, both of Denmark

[73] Assignee: A/S Brüel & Kjaer, Denmark

[21] Appl. No.: 601,062

[22] PCT Filed: Aug. 23, 1994

[86] PCT No.: PCT/DK94/00316

§ 371 Date: Feb. 22, 1996

§ 102(e) Date: Feb. 22, 1996

[87] PCT Pub. No.: WO95/06259

PCT Pub. Date: Mar. 2, 1995

[30] Foreign Application Priority Data

Aug. 24, 1993 [DK] Denmark ............... 93 00384

[51] Int. Cl.$^6$ ............................................. G01C 25/00
[52] U.S. Cl. ................................. 73/1.15; 73/1.38
[58] Field of Search ......................... 73/1 D, 1 DV, 73/1.15, 1.37, 1.38, 1.39

[56] References Cited

U.S. PATENT DOCUMENTS

| 4,418,567 | 12/1983 | Böning et al. | 73/35 |
| 5,103,667 | 4/1992 | Allen et al. | 73/1 D |
| 5,337,260 | 8/1994 | Spangler | 73/1 D |
| 5,373,722 | 12/1994 | Spies et al. | 73/1 D |
| 5,375,468 | 12/1994 | Ohta et al. | 73/1 D |
| 5,438,859 | 8/1995 | Yamashita et al. | 73/1 D |
| 5,447,051 | 9/1995 | Hanks et al. | 73/1 D |

FOREIGN PATENT DOCUMENTS

| 0 523 732A2 | 1/1993 | European Pat. Off. | G01P 21/00 |
| 3542397 A1 | 6/1987 | Germany | G01P 21/00 |
| 2 253 487A | 9/1992 | United Kingdom | G01P 21/00 |

*Primary Examiner*—Hezron E. Williams
*Assistant Examiner*—Richard A. Moller
*Attorney, Agent, or Firm*—Scully, Scott, Murphy and Presser

[57] ABSTRACT

An apparatus for detecting the malfunctioning of an accelerometer (4), where a test signal in the form of a pulse is transmitted from a test signal generator (3) to the accelerometer (4) by a change-over switch (1,2) capable of performing a change to transmit the response signal from the accelerometer (4) to an analyzing circuit (8) so as to be subjected to a malfunction detection. The change-over switch (1, 2) is adapted to alternately connect the accelerometer (4) either to the test signal generator (3) or to the analyzing circuit (8). A particularly simple circuit is obtained wherein the response signal in the form of a ringing is not connected to the analyzing circuit until after the pulse has been transmitted by the test signal generator.

3 Claims, 5 Drawing Sheets

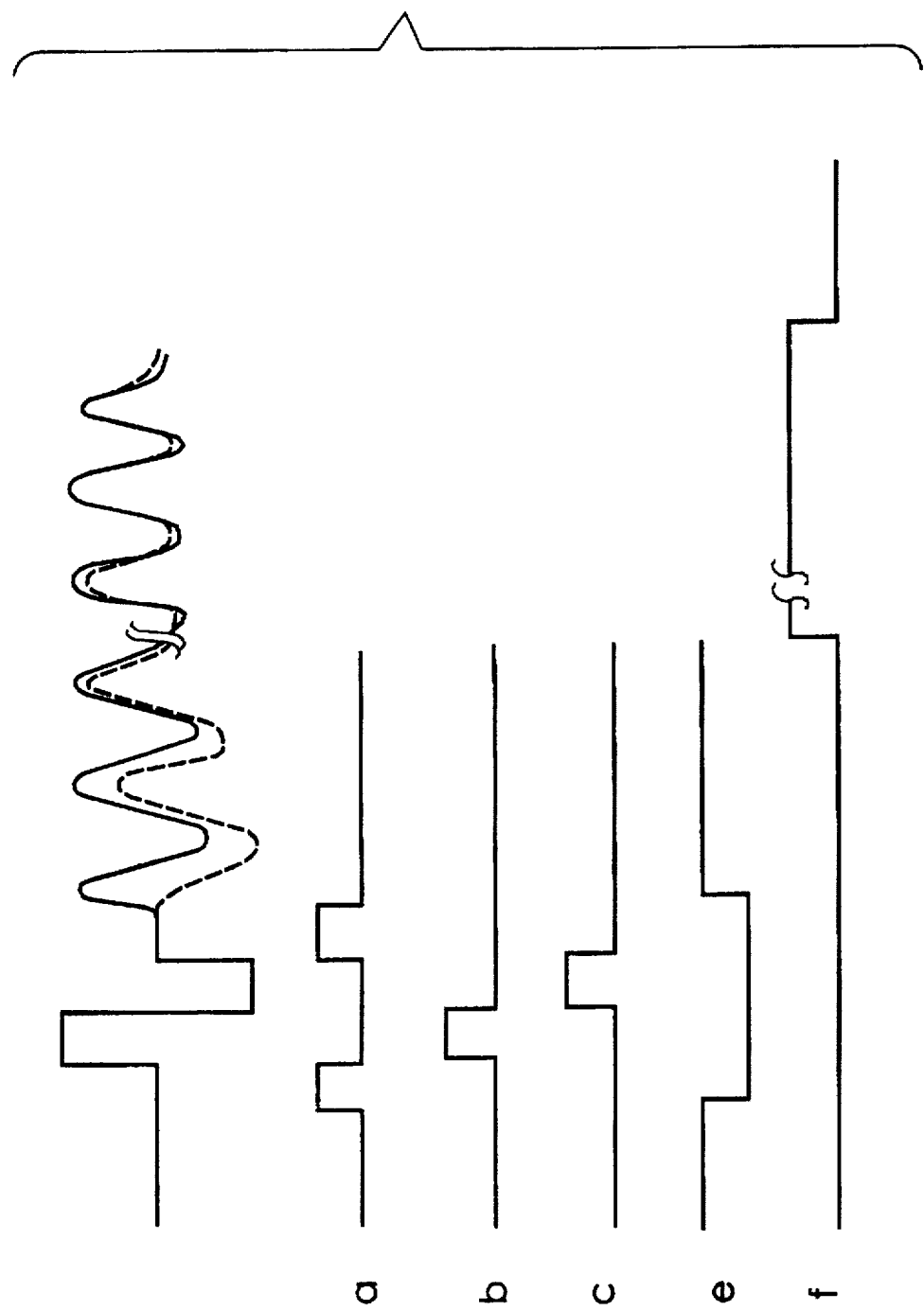

APPARATUS FOR DETECTING THE MALFUNCTIONING OF AN ACCELEROMETER

TECHNICAL FIELD

The invention relates to an apparatus for detecting the malfunctioning of an accelerometer in form of a piezoelectric device, where an electric test signal, preferably in form of a square pulse, can be transmitted from a test signal generator to the piezoelectric device by means of a changeover switch capable of performing a change in such a manner that the response signal from the piezoelectric device can be transmitted to an analysis circuit, preferably a frequency-analyzing circuit, so as to be subjected to a malfunction detection.

BACKGROUND ART

In order to obtain a sufficient measuring accuracy of a vibration measurement by means of an accelerometer it is necessary to meet two requirements, viz. the accelerometer must be mounted on a plane surface and the securing torque or force must be suitable. When the securing torque or force is reduced, the resonance frequency drops until no connection exists at all between the accelerometer and the mounting surface. Subsequently, the free resonance frequency of the accelerometer is measured. The optimum resonance frequency results in the maximum amplitude. A measurement of the resonance frequency of the accelerometer and the associated amplitude results in an indication of the mounting state of the accelerometer. When the resonance frequency of the accelerometer is measured after being mounted and said resonance frequency is compared with a value given on a calibration card or chart the following factors apply:

A lower resonance frequency than the indication given on the calibration chart or card indicates that the accelerometer has not been sufficiently tightened up during mounting. When the measured resonance frequency for instance is 1.5 times the indication of the calibration card it means that the accelerometer has not been mounted. When the measured resonance frequency is very close to the indication of the calibration card it means that the accelerometer has been sufficiently well mounted.

When the mounting to the surface is correct, the frequency and the amplitude of the measurement are stored. A change of the frequency during later measurements indicates that something has happened to the mounting. A change of the amplitude without a simultaneous change of the resonance frequency indicates that the sensitivity of the accelerometer has changed.

It is known from EP Publication No. 534,366 to perform a continuous observation of the mounting state of an accelerometer. A test signal is fed to the accelerometer through a capacitor. Such a capacitor should, of course, be avoided. In addition, a rather complicated analysis circuit is required which must be able to distinguish between applied and actual vibration signals. The feeding of test signals and the analysis are carried out simultaneously.

Furthermore U.S. Pat. No. 4,418,567 discloses a sensor equipment for detecting the motor knocking in a car motor. This equipment comprises a control circuit generating gate control signals for a splitting up into measuring and test phases. The test phase includes detection of a possible malfunctioning of the sensor. The splitting up into measuring and test phases is carried out synchronously with the rotation of the motor. The test signal is in fact fed simultaneously with the measuring procedure. The testing is merely carried out at a time where it is known than no measuring signal exists. Accordingly, this equipment is limited to a particular use.

In addition DE Offenlegungsschrift No. 3,542,397 discloses a device for testing an accelerometer in form of a piezoelectric unit. This piezoelectric unit is tested by being mechanically influenced by an additional piezoelectric unit. This additional piezoelectric unit should, however, be avoided.

BRIEF DESCRIPTION OF THE INVENTION

The object of the invention is to provide an apparatus for detecting the malfunctioning of an accelerometer in the form of a piezoelectric device, and which is far more simple and universal in use than previously known.

The apparatus according to the invention is characterized by the changeover switch being adapted to alternately connect the piezoelectric device either to the test signal generator or to the frequency-analyzing circuit and to detect the response upon termination of the transmission of the test signal.

BRIEF DESCRIPTION OF THE DRAWINGS

The invention is described in greater detail below with reference to the accompanying drawings, in which FIG. 7 illustrates state diagrams of electric signals in the circuit of FIG. 6.

BEST MODE FOR CARRYING OUT THE INVENTION

Figure 1:
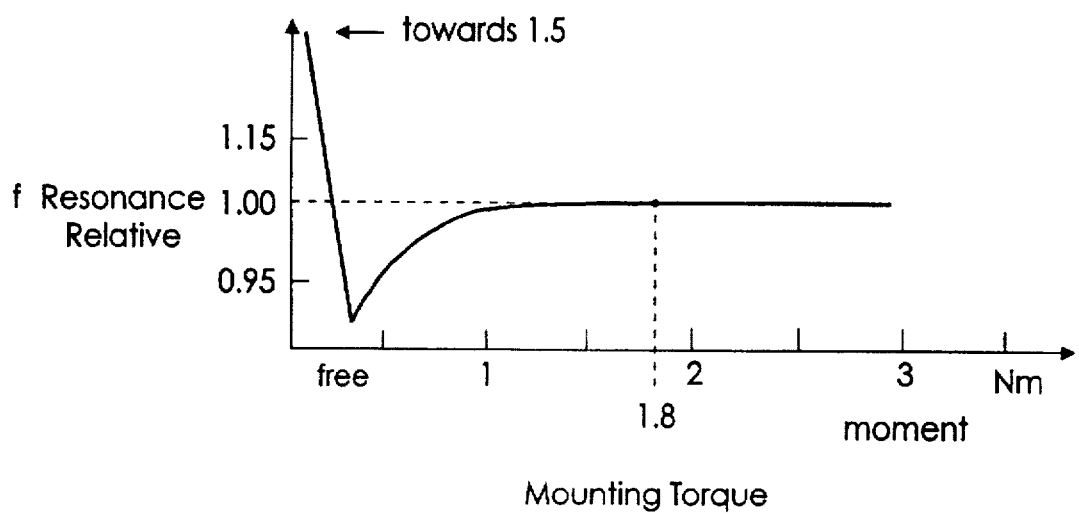
FIG. 1 illustrates the resonance frequency versus the mounting torque of an accelerometer on a plane surface, FIG. 2. illustrates a circuit for detecting the malfunctioning of an accelerometer.
Figure 2:
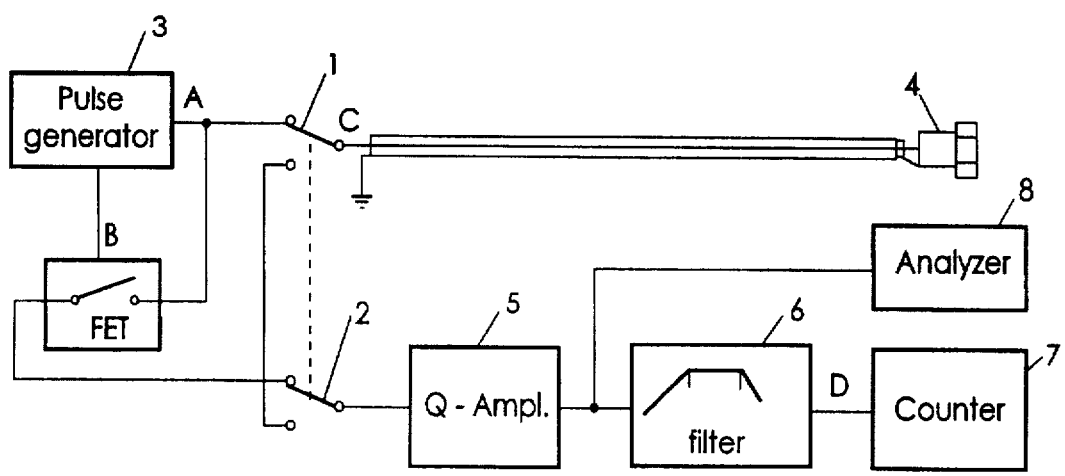

In order to obtain the highest possible measuring accuracy of a vibration measurement by means of an accelerometer it is important that said accelerometer is mounted on a plane and clean surface, and that the mounting, i.e. the securing torque or force of the mounting, is suitable. In connection with a predetermined mounting surface the resonance frequency depends on the securing torque or force. FIG. 1 illustrates an example of the relationship of the securing torque or force and the resonance frequency of a plane surface. When the securing torque or force is reduced, the resonance frequency drops until the connection between the accelerometer and the mounting site has been eliminated. Subsequently, the free resonance frequency of the accelerometer is measured. The maximum resonance amplitude is measured at the optimum resonance frequency. A measurement of the resonance frequency of the accelerometer and the corresponding amplitude results in an indication of the mounting state of the accelerometer. When the resonance frequency of the accelerometer is measured after a mounting and when said resonance frequency is then compared with the resonance frequency given on a calibration chart or card, the following facts apply: When the measured frequency is lower than the indication of the calibration card it means that the accelerometer has not been correctly mounted. When the measured resonance frequency is approximately 1.5 times the indication of the calibration card depending on the type of accelerometer, it means that the accelerometer has not been mounted at all. When the measured resonance frequency is close to the value given on the calibration chart it means that the accelerometer has been properly mounted.

When the mounting to the surface is correct, the frequency and the amplitude are stored in a memory. A change of the frequency during a later measurement indicates that the mounting has been changed. A change of the amplitude without a corresponding change of the resonance frequency indicates that the sensitivity of the accelerometer has been changed.

Figure 3:
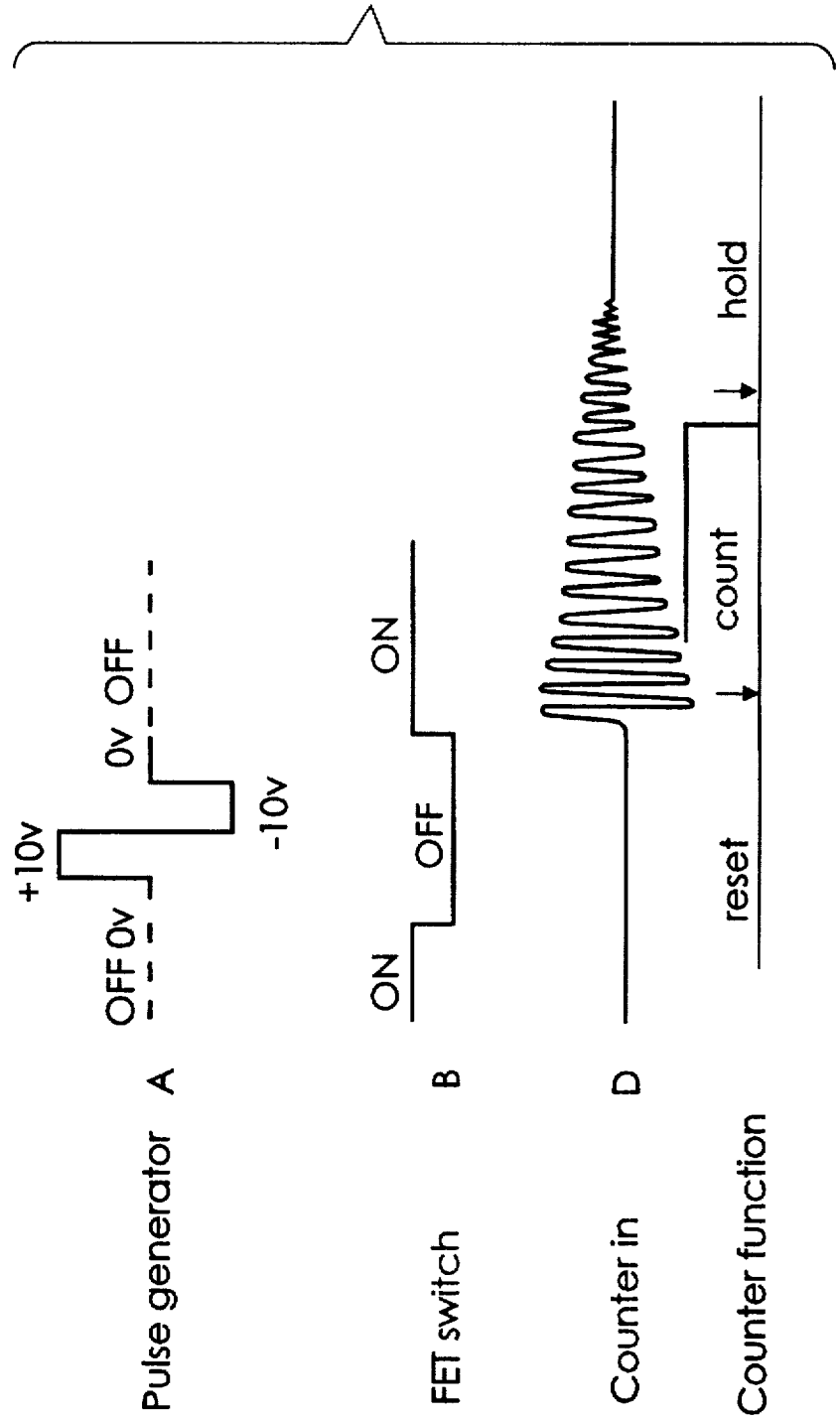
FIG. 3 illustrates state diagrams of electric signals in the circuit of FIG. 2, FIG. 4. illustrates a simplified embodiment of the detector circuit, FIG. 5. illustrates the signals across the accelerometer.

When an accelerometer is supplied with a low-impedanced square pulse with a fundamental frequency matching the resonance frequency of the accelerometer, said accelerometer responds by emitting a ringing at the resonance frequency or frequencies, cf. FIG. 3. This ringing can typically be measured approximately 1 μsec after termination of the pulse. When an accelerometer is mounted in such a manner that it is only in contact with the surface at a few points, the response signal includes several close resonances. When the response signal is received, the accelerometer 4 response signal can furthermore include a low DC voltage which must be filtered off. The response signal can be analyzed for instance by means of an analyzer, such as a frequency analyzer 8. As a result it is possible to determine whether several resonance frequencies occur. The presence of several resonance frequencies indicates that the accelerometer 4 is in contact with the surface in question at several locations. A measurement of the response signal at a correct mounting on a good surface results in an indication of the sensitivity of the accelerometer 4. A change-over switch 1, 2 switches between a standard measuring state and a testing state by connecting the accelerometer 4 either to a test signal generator 3 or directly to the analyzing circuit 8 or a counter coupled thereto in parallel.

The response signal is subjected to a filtration by means of a band-pass filter 6 in order to eliminate undesired DC and internal resonances in the accelerometer 4, the latter being rather highly positioned. The band-pass filter can for instance cover the range from 10 kHz to 30 kHz.

Figure 4:
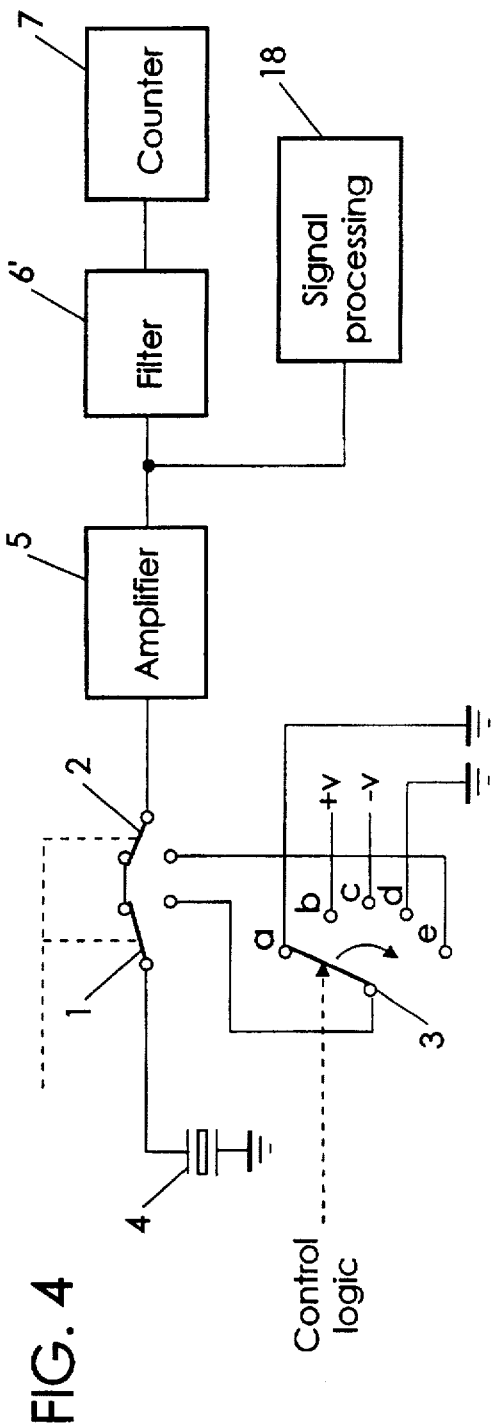
Figure 5:
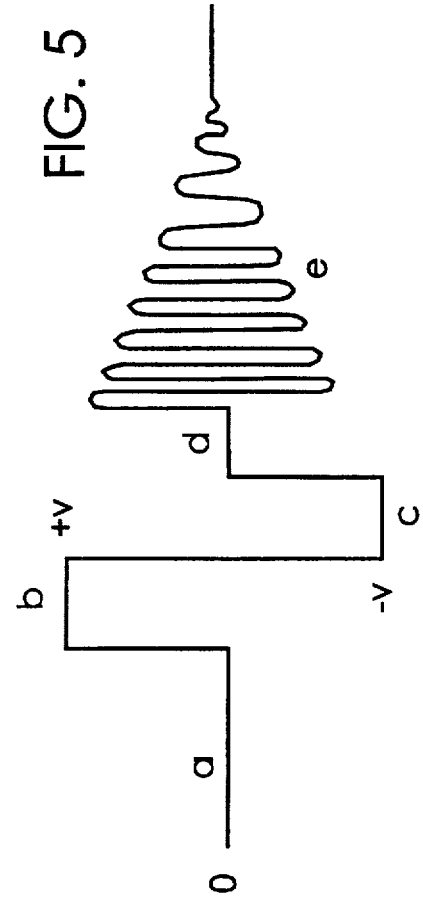

FIG. 4 illustrates a simplified embodiment of the detecting apparatus according to the invention. This embodiment comprises an accelerometer 4 in form of a piezoelectric device, a change-over switch 1, 2, and a test signal generator 3 controlled by a logic circuit. The change-over switch 1, 2 comprises two contact arms which can switch between a measuring and a testing state in the uppermost and lowermost position, respectively, of said contact arms. A test procedure of the test signal generator 3 corresponds to passing five positions a, b, c, d, e of a contact arm, said procedure being terminated at the lowermost position e where the accelerometer is connected to an amplifier 5. The path or time record of the signals across the accelerometer 4 is illustrated in FIG. 5 together with the positions of the contact arm. The contact arm can be controlled by a logical circuit.

The amplifier 5 can be a voltage amplifier or a charge amplifier. A high-pass filter 6' serves to filter off low-frequency components before the signal is transmitted to a counter 7 counting the number of zero crossings. The signal can be transmitted alternatively or simultaneously to a measuring equipment 18 connected between the amplifier 5 and the filter 6'.

The test signal starts at zero or at a level corresponding to the DC-input level of the amplifier 5 and ends up at the same level after having passed an equal number of positive and negative pulses. When the test signal generator 3 is disconnected the signal level is such that the ringing signal is symmetrical relative to zero. As a result the signal analysis can start immediately. The illustrated example includes only one positive and one negative pulse, but the principle is, however, not limited to this number. Another logical control can for instance be adapted to generate n positive and negative pulses.

Figure 6:
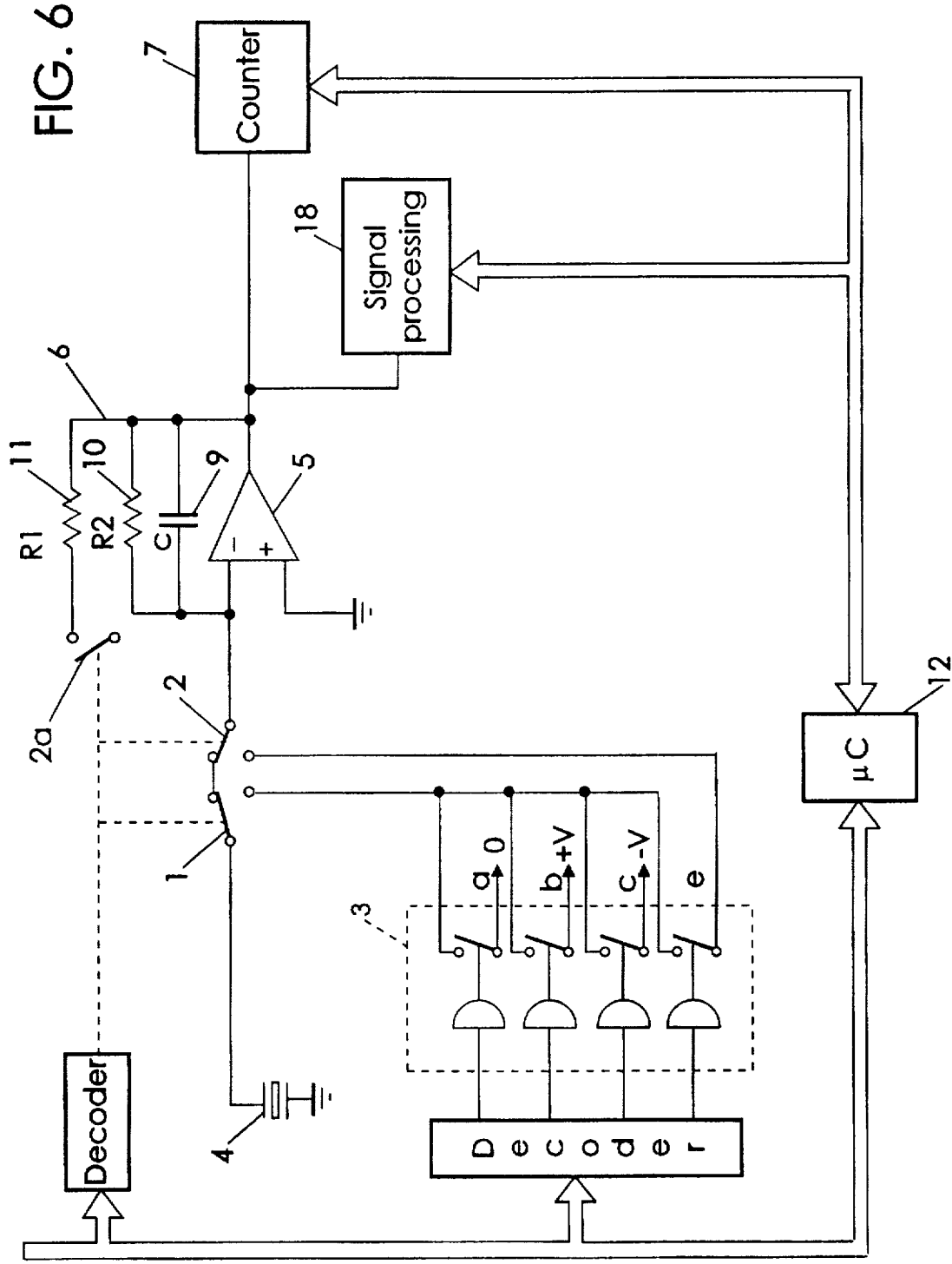
FIG. 6 illustrates a preferred embodiment of the detector circuit according to the invention.

FIG. 6 illustrates an embodiment of the detecting apparatus according to the invention. The amplifier 5 is a charge amplifier presenting a time constant $T_1=R_2 \cdot C$ in the measuring position for the change-over switches 1, 2, 2a and a time constant $T_2=(R_2\|R_2) \cdot C$ in the testing position. $T_2$ is lower than $T_1$ as the measuring position only involves measuring at relatively high frequencies. In addition, the test signal generator formed by a change-over switch 3 comprises only four positions. A microprocessor 12 connected thereto controls the switching between the measuring state and the testing state, the pulse generator signal from 3, as well as the signal processing at the measuring equipment 18 and the counting at the counter 7, said microprocessor 12 communicating with a decoder for the change-over switches 1,2, 2a, a decoder for the change-over switch 3, the measuring equipment 18, and the counter 7, respectively, through one or more buses.

FIG. 7 illustrates a state diagram of the circuit in FIG. 6 for the signals across the accelerometer, a, b, c, e the control signals to the four analogous gates, where a high level indicates that the gate in question is closed, whereas a low level indicates that the gate in question in open, e is low whereas a, b or c is high indicating that the amplifier is disconnected. When the amplifier is connected after the activation of the accelerometer through a, b, c, the signal oscillations shown at the top of FIG. 7 are amplified before they are transmitted to the counter 7. The counter 7 is not opened until after a period, preferably 5 to 10 times $T_2$ which is due to the fact that the oscillations at the beginning of the counting can be at a maximum, shown with a dashed line in FIG. 7, with the result that a predetermined oscillation period is required in order to obtain a reliable counting. $T_2$ can be 10 to 20 μsec., and f), respectively, the signal for opening the counter 7.

What is claimed is:

1. Apparatus for detecting the malfunctioning of a piezoelectric accelerometer comprising:
   a. a test signal generator for generating an electric test signal for the piezoelectric accelerometer;
   b. a frequency analysis circuit for analyzing a response signal from the piezoelectric accelerometer to the electric test signal for malfunction detection;
   c. a change-over switch for connecting the piezoelectric accelerometer first to only the test signal generator and secondly to only the frequency analysis circuit which detects the response signal from the piezoelectric accelerometer only after termination of the application of the test signal from the test signal generator.

2. Apparatus as claimed in claim 1, wherein the test signal generator generates a square pulse test signal with a fundamental frequency substantially matching the resonance frequency of the piezoelectric accelerometer.

3. Apparatus as claimed in claim 1, wherein the change-over switch operates to allow the analysis circuit to detect the response signal approximately 1 μsec after termination of the application of the test signal to the piezoelectric accelerometer.

* * * * *